H. KOEPPLINGER.
CUTTING AND PUNCHING MACHINE.
APPLICATION FILED JUNE 20, 1912.
1,102,761.
Patented July 7, 1914.
3 SHEETS—SHEET 1.
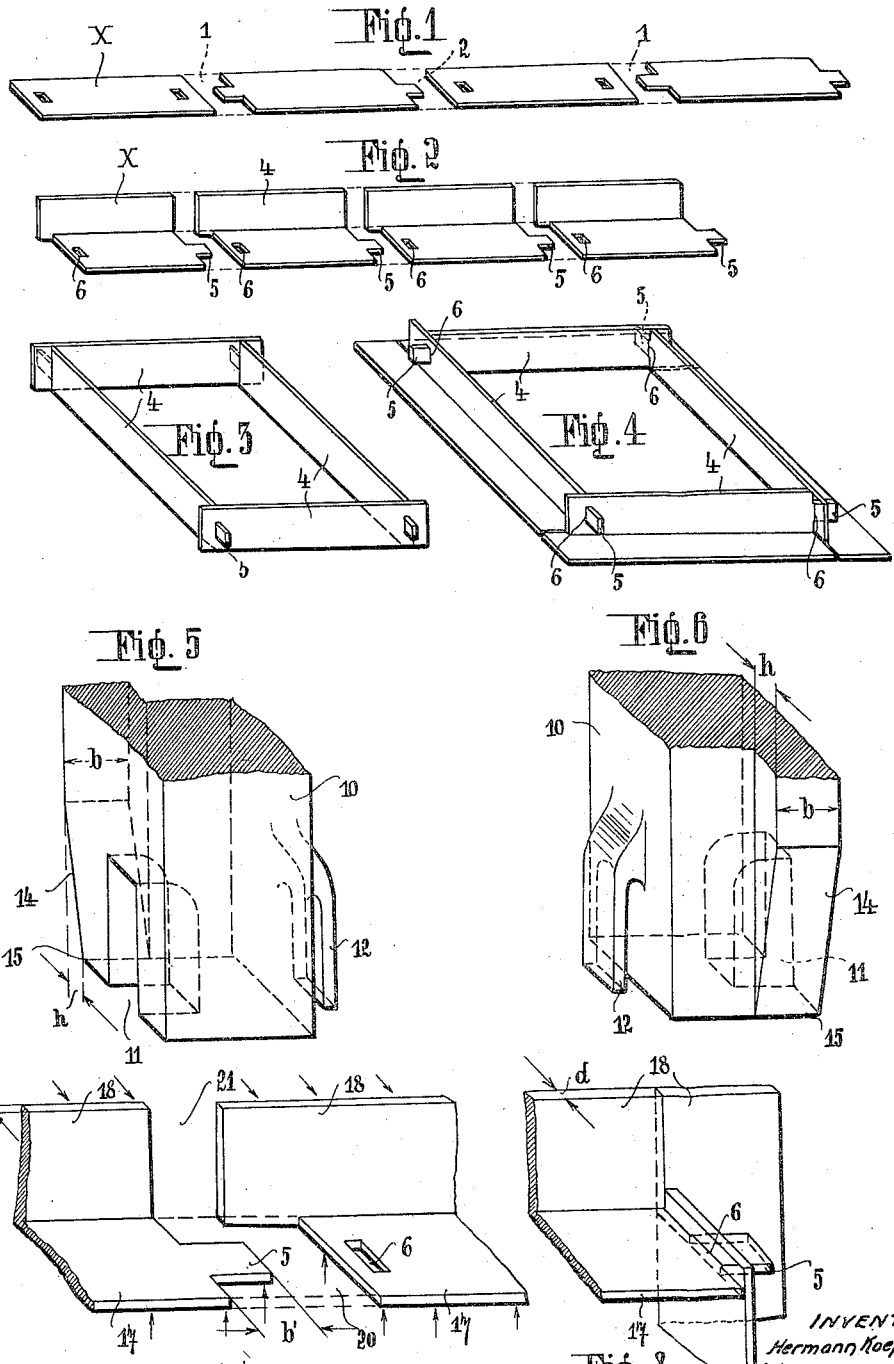

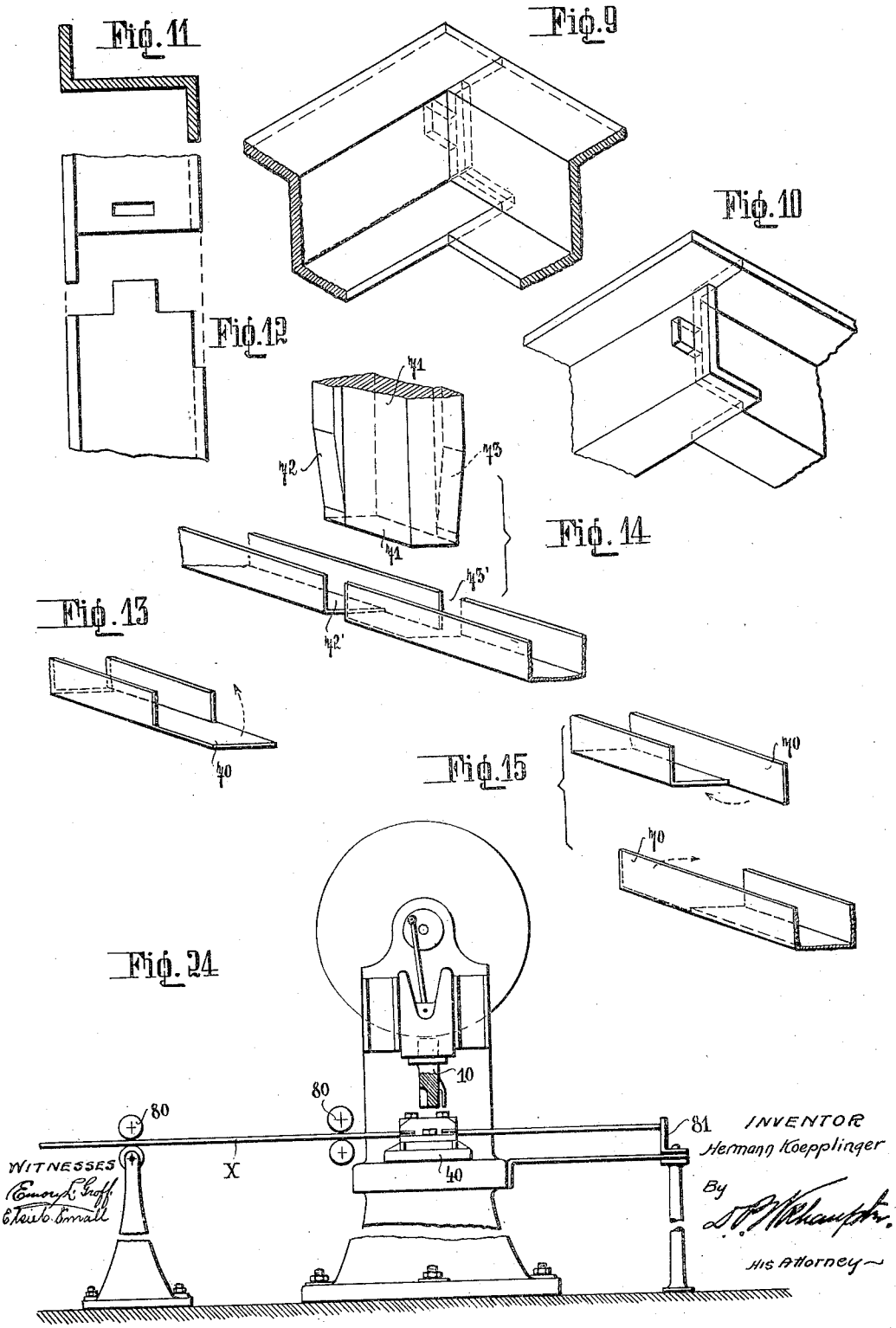

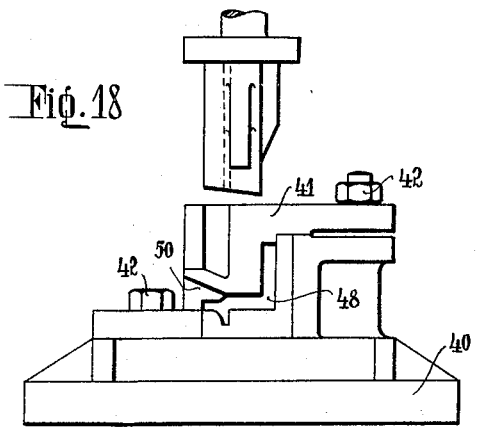
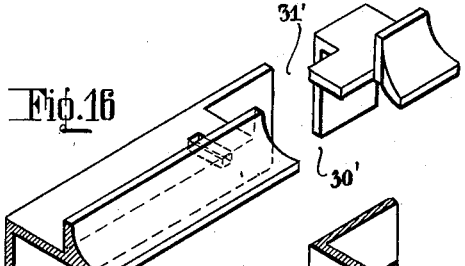
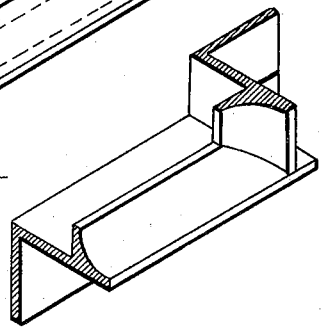
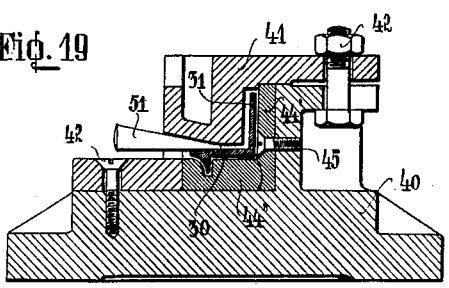
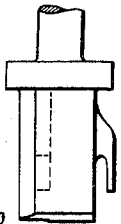
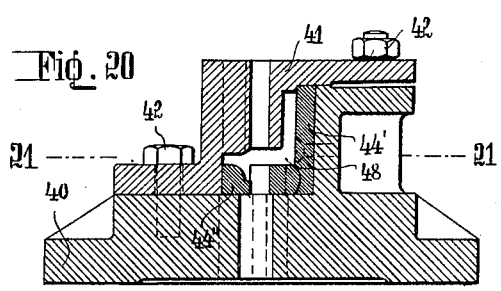
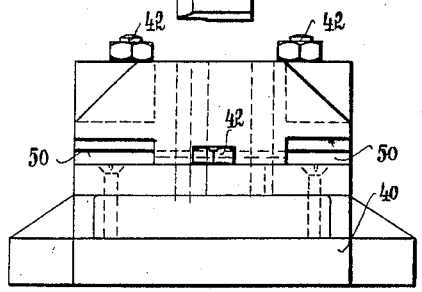
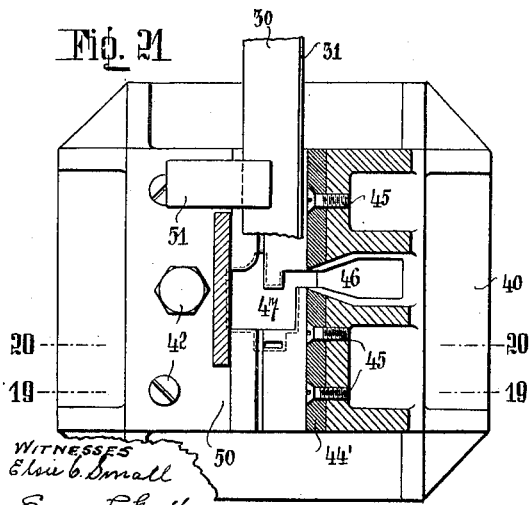
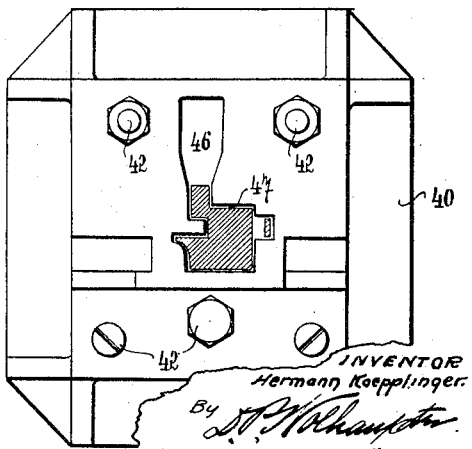

UNITED STATES PATENT OFFICE.

HERMANN KOEPPLINGER, OF VIENNA, AUSTRIA-HUNGARY.

CUTTING AND PUNCHING MACHINE.

1,102,761.

Specification of Letters Patent.

Patented July 7, 1914.

Application filed June 20, 1912. Serial No. 704,824.

*To all whom it may concern:*

Be it known that I, Ing. HERMANN KOEPPLINGER, a citizen of the Empire of Austria-Hungary, residing at 23 Herklotzgasse, Vienna, XV, Austria-Hungary, have invented certain new and useful Improvements in Cutting and Punching Machines, of which the following is a specification.

The present invention relates to improvements in the manufacture of frames and similar structures, and has for its particular object to simplify and cheapen the manufacture of the frame members.

The invention enables the frame members to be made in a simple and cheap manner from practically any kind of rolled iron rails. This object is obtained partly by a novel shape of the end portions of the members and partly by the employment of novel means for cutting and stamping the members from the blank.

In the accompanying drawing: Figure 1 represents the members of a frame of the hitherto usual construction, while Fig. 3 shows a known kind of frame made from the members shown in Fig. 1, Fig. 2 represents four members of the new construction, these members being shown in the position which they occupy in the blank from which they are cut, Fig. 4 shows a frame made from members shown in Fig. 2, Figs. 5 and 6 illustrate in two views a combination tool for producing frame members of the kind shown in Figs. 2 and 4, Fig. 7 is a view drawn to a larger scale of two adjacent ends of frame members, Fig. 8 is a view of the joint between two frame members when the same are in their assembled position, Figs. 9 and 10 show in outer and inner view the connection between two members of Z-section, Fig. 11 shows the cross section of a Z member, Fig. 12 is a plan showing the formation of the ends of two adjacent members, Fig. 13 illustrates a frame member of known construction made of U-iron, Figs. 14 and 15 illustrate the construction of U-iron members according to the invention and a tool for cutting the members from the blank, Figs. 16 and 17 illustrate a joint between the frame members of a peculiar section, and the ends of two adjacent members, Fig. 18 is an elevation of a swage and corresponding punch for making frame members of the kind shown in Fig. 16, Fig. 19 is a vertical section on line 19—19 of Fig. 21, Fig. 20 is a section on line 20—20 of Fig. 21, Fig. 21 is a section on line 21—21 of Fig. 20, Fig. 22 is another view of the punch and swage, Fig. 23 is a plan of the swage, Fig. 24 shows a complete apparatus for cutting the members from the blank.

Hitherto frames of the kind shown in Fig. 3 were made from members of the kind illustrated in Fig. 1. These members were produced by one of the following two methods.

The openings 1 and 2 were produced simultaneously by means of two symmetrically arranged punches of corresponding cross section, or only one punch was used, the punch being turned by 180 degrees between the two operations. Both methods have great disadvantages, as it is inconvenient to punch the material in two places simultaneously, while the turning of the tool between two operations increases the work of the operator and necessitates a special manner of mounting the tool. These drawbacks are obviated by the present invention which enables a single tool to be used which in a single operation separates the adjacent ends of the members from each other and at the same time produces the required shape of the members.

The contour of the figure along which the tool acts upon the strip blank $x$ depends upon the particular use to which the members are to be applied and upon the section of the blank. The manufacture of frame members from a strip, bar or rail of U-section will now be described.

Each of the side members of the frame is provided at one end upon the web which is to be used for making the connection with the projecting portion tongue or tag 5, and is provided at the other end upon the same web with a hole or slot 6 corresponding exactly as regards size and position with the projection 5. It will thus be seen that the frame members 4 are not formed in the same manner at both ends as the member shown in Fig. 1, but are all alike, each being provided with a projection 5 at one end and a hole 6 at the other end. In order to produce the novel shape of the members by means of a single tool and without altering the position of the tool after each operation, a tool of peculiar construction, illustrated in Figs. 5 and 6 may be used. The same consists of a prismatic main punch 10, the base of which corresponds to the portion of the material to be punched out of one web of the blank. It will be seen that the punch has a recess 11 corresponding to the tag or tongue 5. Upon the side of the punch is provided an auxiliary punch or slotting tool 12 which produces the hole or slot 6. Upon the side of the punch which is adjacent to the other web of the blank is formed a wedge shaped portion 14, the edge 15 of which is at the base of the punch. The depth $h$ of the wedge should be larger than the thickness $d$ of the material upon which the wedge acts. The tool is moved relatively to the blank which is supported in the direction of the arrows in such a manner that the portion 20 and the portion corresponding to the hole 6 are first stamped out of the web 17 of the blank. During the further descent of the pouch the portion 4 which represents a shearing punch 14 is brought into operation so as to cut the portion 21 out of the web 18. The operations of dividing the blank and shaping the adjacent ends of the frame members are thus simultaneously effected. The blank is then fed a suitable distance and the operation is repeated. The members obtained in the described manner are connected as shown in Figs. 4 and 8 by inserting the projecting portion 5 of one member into the opening 6 of the next member and so on. The projecting portions or tags 5 may then be hammered into the shape of rivets. The shape of the opening or recess 11 and the auxiliary punch 1 as well as that of the shearing punch 14 may of course be altered according to the section of the blank used.

In the practice of the invention it has been found that the best results are obtained if the width $b$ of the shearing punch 14 (Figs. 5 and 6) is exactly equal to the depth $b^1$ of the tag or tongue. The frame members produced by the improved method do not require any machining as the surfaces along which the division takes place are very cleanly cut.

The invention may be applied to making frame members from practically any kind of section or figured iron. Figs. 16 and 17 show two frame members made of figured iron in their relative positions in the strip and after assembling.

The shape of the combination tool may be easily determined from the shape of the pieces to be stamped out and shorn off. The basis of the prismatic main punch corresponds to the portion 31 to be cut out of the horizontal web 30, while the wedge shaped shearing punch provided on the main punch must have a shape suitable for shearing out the portion $31^1$ out of the vertical web 31.

It should be observed that in order to satisfactorily perform the simultaneous operation of stamping and shearing, it is necessary that the work piece should be very accurately and firmly held in the swage. The swage illustrated in Figs. 18, 19, 20, 21, 22 and 23 is adapted for working figured iron of the section shown in Fig. 16.

The swage comprises a solid base plate 40 and a top plate or cover 41 secured to the base plate by bolts 42. Between the base plate 40 and the top plate 41 is arranged a peculiarly shaped wearing plate 44 fixed to the base plate by screws 45. The wearing plate possesses a vertical web $44^1$ supporting the vertical web 31 and a horizontal web $44''$—upon which rests the main web 30 of the work piece. The vertical web of the wearing plate is provided with an opening 46 through which the cut off portion $31^1$ drops out. The same opening accommodates the shearing punch. The horizontal web of the wearing plate is provided with an opening 47 corresponding to the contour of the portion to be stamped out. The rail of figured iron is inserted into the swage from the side through the opening 48. On both sides of the opening 49 through which the tool works are provided two wedge shaped openings 50, 50, through which clamping wedges 51 are introduced for holding down the work piece during the operation. These clamping wedges hold the work piece close to the part operated upon by the combination tool (Fig. 19). During the descent of the tool, the portions $30^1$ and $31^1$ (Fig. 16) are stamped out or cut off so that the required shape of the tool ends of the frame members is obtained in one operation.

The shape of the combination tool and swage for making the frame members of Z-section (Fig. 11) may be easily determined from the contour of the parts to be stamped out or cut off (Fig. 12).

In making frame members of U-section, a tool of the kind illustrated in Fig. 14 may advantageously be used. According to the known method of making frame members of U-section (Fig. 13) the tag or tongue for locking two adjacent members was made in the main web, the locking of two members being effected by bending the tag in the direction of the arrow (Fig. 13). The frame members were cut to the required shape by means of several tools operating successively upon blanks. According to the present invention the continuous strip from which the frame members are made is divided in one single operation, which at the same time produces the required shape of the end portions of the frame members. The tool used is shown in Fig. 14 and consists of a prismatic main body 71 for stamping out a portion of the main web, and two laterally arranged shearing punches 72, 73 for shearing out or cutting out the portions $72^1$ and $73^1$. During the descent of the combination tool a portion of the horizontal web corresponding exactly to the base of the main punch is stamped out, while during the further downward movement the portions $72^1$ and $73^1$ are gradually shorn or pressed out. It will be seen that U-section frame members made according to this method differ from the frame members shown in Fig. 13 by having the locking tags 70 (Fig. 15) not upon the main web but upon one of the lateral webs. By bending the tag 70 in the direction of the arrow the same kind of lock may be obtained as with the known method.

It will be seen from Figs. 2, 4, 7, 8, 9, 12, 16 and 17 that all the frame members are exactly alike, each member being provided at one end with a tag and at the opposite end with a corresponding tag hole or opening. The advantages of the invention result from the use of a single tool which in one single operation divides the strip and also produces the required shape of the end portions. As mentioned above the surfaces along which the cutting and shearing action of the tool takes place are very clean so that they do not require any machining or finishing. The present invention enables large quantities of frame members to be manufactured from a continuous length of strip in a very simple and cheap manner.

As may be seen from Fig. 24 there is no difficulty in fitting the improved tool to a stamping press of known kind. It is advisable to provide the stamping press with a feeding device consisting of rollers 80 and with a guiding device 81 for holding the strip in proper alinement. The strip may be fed intermittently between two operations of the tool.

I claim:

1. A machine for cutting and punching interlocking frame members from the same metal blank, including a supporting frame and a reciprocating plunger carrying a cutting tool, said cutting tool having a cutting edge for dividing the blank into frame members and a punch element for simultaneously forming adjacent interlocking end portions thereon.

2. A machine for cutting and punching interlocking frame members from a single metal blank including a supporting frame and a reciprocating plunger, a shearing and punching tool carried by said plunger, said tool having a cutting edge for dividing the metal blank into frame members, punch elements for simultaneously forming adjacent interlocking end portions, and means for advancing the metal stock to the tool.

3. A machine for cutting and punching interlocking frame members from the same metal blank, including a supporting frame and a reciprocating plunger, a tool carried by said reciprocating plunger, said tool having a cutting portion for dividing the frame members, and also having a tongue forming recess in its lower face, and a punch element for simultaneously forming tongue receiving openings in an adjacent frame member.

4. A machine for cutting and punching interlocking frame members from metal stock including a supporting frame and a reciprocating plunger, a tool carried by the latter, a bed plate mounted upon the supporting frame, a top plate removably attached to the said bed plate, a removable wear plate insertible between the top and bed plate, and means for holding the metal stock in position against the wear plate to be operated upon by the tool.

5. A machine for cutting and punching interlocking frame members from metal stock including a supporting frame and a reciprocating plunger, a punching and shearing tool carried by the latter, a swage comprising a bed plate having an opening, a top plate removably attached to the bed plate having a central opening and wedge-shaped recesses, an angled removable wear plate insertible between the top and bed plates, and also having an opening to accommodate the passage of the tool, and means for entering the wedge-shaped recesses in the top plate for forcing and holding the stock against the removable wear plate.

In testimony whereof I affix my signature in presence of two witnesses.

ING. HERMANN KOEPPLINGER.

Witnesses:
  AUGUST FUGGER,
  ADA MARIA BERGER.